(12) United States Patent
Agrawal et al.

(10) Patent No.: US 6,792,377 B1
(45) Date of Patent: Sep. 14, 2004

(54) AUTOMATIC STATISTICAL TEST SEQUENCE GENERATOR AND METHODS THEREOF

(75) Inventors: Kaushal K. Agrawal, San Jose, CA (US); David N. K. Wong, Milpitas, CA (US)

(73) Assignee: Calient Networks, San Jose, CA (US)

( * ) Notice: Subject to any disclaimer, the term of this patent is extended or adjusted under 35 U.S.C. 154(b) by 166 days.

(21) Appl. No.: 10/188,211

(22) Filed: Jul. 1, 2002

Related U.S. Application Data

(60) Provisional application No. 60/365,052, filed on Mar. 12, 2002.

(51) Int. Cl.[7] ................................................ G06R 27/28

(52) U.S. Cl. .......................... 702/119; 702/117; 714/33

(58) Field of Search ......................... 714/33, 37, 736, 714/738; 702/117, 119; 716/4, 5; 379/1.01, 10.01, 26.01, 9.01, 9.02

(56) References Cited

U.S. PATENT DOCUMENTS 5,202,889 A * 4/1993 Aharon et al. .............. 714/739
5,455,938 A * 10/1995 Ahmed .......................... 716/5
6,480,800 B1 * 11/2002 Molyneaux et al. ........ 702/120

* cited by examiner

Primary Examiner—Stephen J Cherry
(74) Attorney, Agent, or Firm—Beyer Weaver & Thomas, LLP

(57) ABSTRACT

A TL1 usage model generator arranged to provide a statistically accurate usage model based upon a particular user profile is described. The TL1 usage model generator is connected to a translator arranged to expand the usage model provided the by TL1 usage model generator into a fully meshed file. Coupled to the translator, a TL1 sequence generator uses the fully meshed file to automatically generate a random sequence of TL1 commands that is provided to an execution engine configured to read the random sequence of TL1 commands. The execution engine, in turn, sends the random sequence of TL1 commands to the system under test (SUT) the results of which are forwarded to and written in a result data base used by a post processor to verify the validity of the system response.

22 Claims, 11 Drawing Sheets

AUTOMATIC STATISTICAL TEST SEQUENCE GENERATOR AND METHODS THEREOF

CROSS REFERENCE TO RELATED APPLICATIONS

This application claims the benefit of priority to U.S. Provisional Patent Application No.: 60/365,052, filed Mar. 12, 2002, entitled: AUTOMATIC STATISTICAL TEST SEQUENCE GENERATOR AND METHODS THEREOF.

BACKGROUND OF THE INVENTION

1. Field of Invention

The invention relates generally to optical switching test protocols. More particularly, the invention relates to an automatic statistical test sequence generator and methods thereof consistent with TL1 test.

2. Description of Relevant Art

A telecommunications management network (TMN) agent is an application that runs on a network element (NE) that provides one or more management systems the ability to manage the NE. An embedded TMN agent is used to manage a telecommunications device that uses a real-time operating system (RTOS). The role of a TMN agent application is to provide one or more management systems the ability to manage an NE. An embedded TMN agent resides on a board that controls a shelf or shelves in an equipment rack that makes up an NE. These boards are often referred to as shelf control units (SCUs) or management processing units (MPUs). The agent runs in an RTOS. This special operating system is small, fast, and inexpensive in large quantities, which makes it ideal for telecommunications equipment. The agent running in the SCU performs management functions on the rest of the boards in the rack. The agent receives the management requests from a manager application, which typically resides on a remote system.

The manager and agent applications communicate using common management information protocol (CMIP) over an open systems interconnection (OSI) protocol stack. OSI, embraced by TMN recommendations, is a standard way for two applications to communicate across the network. CMIP is an object-oriented protocol for management also embraced by TMN recommendations. CMIP over an OSI stack is the TMN standard for communication between manager and agent.

Management systems access telecommunications equipment to perform a variety of management functions on the device. These functions are known in the telecommunications world as operations, administration, maintenance, and provisioning (OAM&P). In the TMN framework, these are broken down into five primary management functions: configuration management, fault management, performance management, accounting management, and security management.

TMN is a standard way to manage a telecommunications network. But many telecommunications equipment manufacturers still use proprietary or region-specific network management agents, such as transaction language 1 (TL1 ). TL1 language is a Bellcore standardized command set that provides OAM&P functionalities for telecommunication equipment. From a testing perspective, verification of TL1 functionality has traditionally been focused on the command syntax and the proper operation of individual TL1 commands. However, experience has shown that tests, conducted in this manner are insufficient to guarantee the quality of the software. Each TL1 command may work flawlessly when executed individually, but the system may react differently or even experience failure depending on the commands selected and/or the order in which they are executed. For example, different users may experience or perceive a different level of quality of the same system based upon their particular conditions of use. A casual user, for example, may never experience any problem whereas a power user who touches on various aspects of the system may experience substantial problems due to the complex interaction with the system.

In addition, during a check out phase of product development, information on how a particular system is used by an end user may not be readily available until some time after the product is released. In order to minimize verification escapes (i.e., undetected failure modes), designers will try to anticipate all reasonably likely operational scenarios. However, in order to provide anything even closely resembling 100% test coverage would be prohibitively expensive in time and capital.

Unfortunately, however, there is currently no schema for creating a sequence of TL1 commands that closely resemble the way in which a customer would in fact use the system or would provide test coverage sufficient to assure what would be considered in the art as a fully tested product.

Therefore what is desired is a tool for automatically generating a TL1 command sequence that soaks a system (i.e.; fully testing in a variety of operational scenarios) as part of a QA verification process.

SUMMARY OF THE INVENTION

In the described embodiment, A statistical test tool for operational testing of a system under test (SUT) is described. The test tool includes a user specific usage model generator arranged to provide a statistically accurate user specific usage model based upon a particular user profile and a translator coupled to the usage model generator arranged to expand the usage model provided the by the usage model generator into a fully meshed file. The test tool also includes a sequence generator coupled to the translator that uses the fully meshed file to automatically generate a random sequence of commands.

In a preferred embodiment, the test tool is a TL1 test tool.

In another embodiment, a method for providing a statistical test tool for operational testing of a system under test (SUT) is described. A statistically accurate user specific usage model based upon a particular user profile is provided. The usage model provided the by the usage model generator is expanded into a fully meshed file and a random sequence of commands based upon the fully meshed model is automatically generated.

In yet another embodiment, an apparatus for providing a statistical test tool for operational testing of a system under test (SUT). The apparatus includes means for providing a statistically accurate user specific usage model based upon a particular user profile, means for expanding the usage model provided the by the usage model generator into a fully meshed file, and means for automatically generating a random sequence of commands based upon the fully meshed model.

In still another embodiment of the invention, a system for automatically providing a TL1 based statistical test sequence to a system under test (SUT) is described. In the described embodiment, the system includes a TL1 usage model generator arranged to provide a statistically accurate usage model based upon a particular user profile. The TL1 usage model generator is connected to a translator arranged to expand the usage model provided the by TL1 usage model generator into a fully meshed file. In particular, at a specific test level, the fully meshed file includes all possible transitions of a particular test component to any other test component, including itself, on that specific test level. Coupled to the translator, a TL1 sequence generator uses the fully meshed file to automatically generate a random sequence of TL1 commands that is provided to an execution engine configured to read the random sequence of TL1 commands. The execution engine, in turn, sends the random sequence of TL1 commands to the system under test (SUT) the results of which are forwarded to and written in a result data base used by a post processor to verify the validity of the system response.

These and other features and advantages of the present invention will be presented in more detail in the following specification of the invention and the accompanying figures that illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In the following description, frameworks and methods of automatically providing an apparatus and a system for providing a TL1 based statistical test sequence to a system under test (SUT) is described. In the described embodiment, the system includes a TL1 usage model generator arranged to provide a statistically accurate usage model based upon a particular user profile. The TL1 usage model generator is connected to a translator arranged to expand the usage model provided the by TL1 usage model generator into a fully meshed file. In particular, at a specific test level, the fully meshed file includes all possible transitions of a particular test component to any other test component, including itself, on that specific test level. Coupled to the translator, a TL1 sequence generator uses the fully meshed file to automatically generate a random sequence of TL1 commands that is provided to an execution engine configured to read the random sequence of TL1 commands. The execution engine, in turn, sends the random sequence of TL1 commands to the system under test (SUT) the results of which are forwarded to and written in a result data base used by a post processor to verify the validity of the system response.

Figure 1:
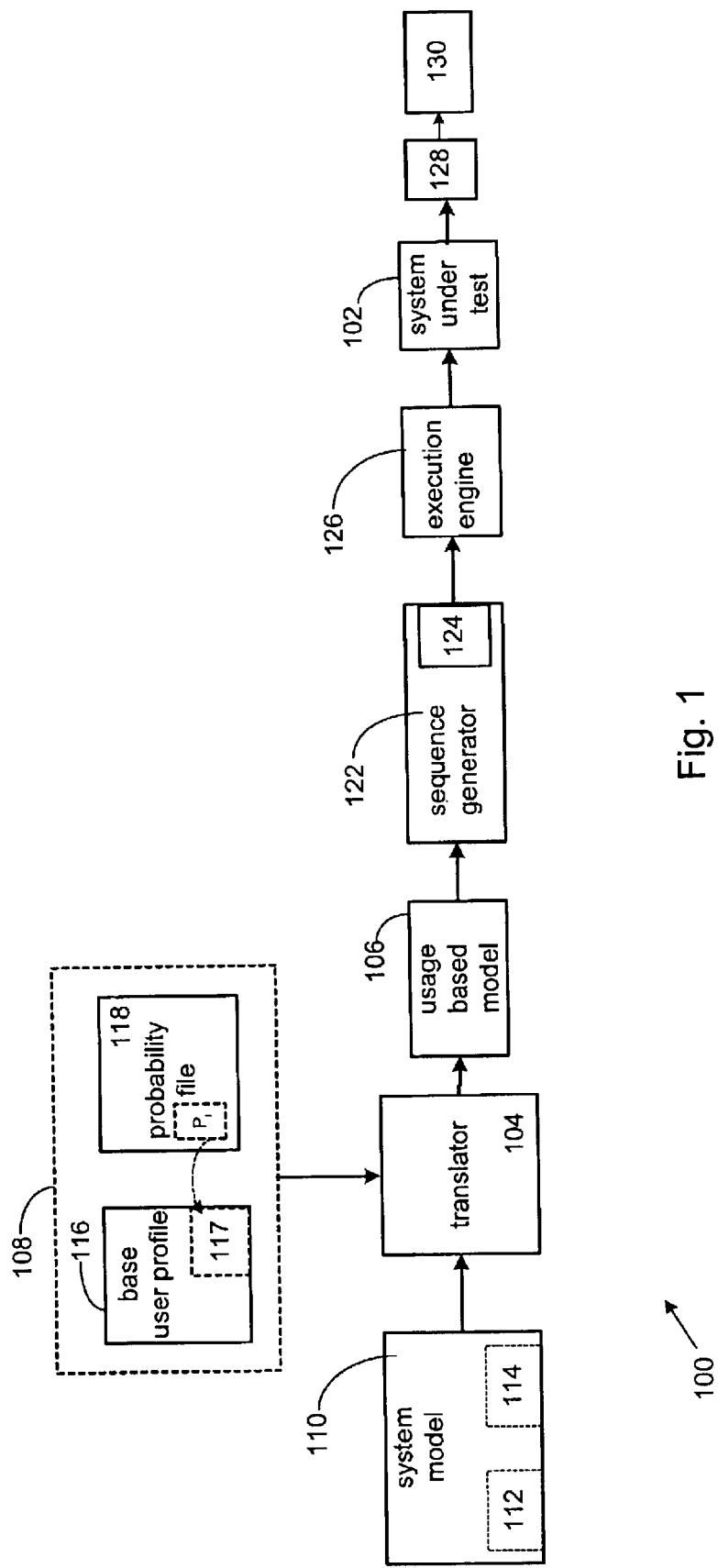
FIG. 1 shows a probabilistic TL1 based test system arranged to exercise a system under test (SUT) in accordance with an embodiment of the invention.

Referring now to FIG. 1, a probabilistic TL1 based test system 100 arranged to exercise a system under test (SUT) 102 in accordance with an embodiment of the invention is shown. The system 100 includes a translator unit 104 arranged to generate a user specific usage based model 106 based upon a user's functional model 108 and a system model 110. In the described embodiment, the system model 110 is, in turn, based upon specific system operational specifications 112 and system requirements 114 consistent with the SUT 102. Examples of such system requirements include system reliability, system availability, etc. whereas examples of system operational specifications include design performance, speed, etc. In addition to the system operational specifications 112 and the system requirements 114, the translator unit 104 uses the user's functional model 108 to generate the usage based model 106.

In the described embodiment, the user's functional model 108 includes a base user profile 116 that includes in a particular embodiment, a test command model 117 containing various expected user system test commands in the form of TL1 commands. Associated with the user functional model 108 is a user specific probability profile 118 that includes a probability index P, for each of the TL1 commands included in the test command model 117. It should be noted that any number and combinations of base user profiles 116 can be associated with any number of probability files 118 in order to provide any number of associated user specific functional models 108. This ability to customize a particular functional model to any particular user is especially useful in those situations where a number of different users (each having varying test requirements) are contemplated to be using the SUT 102. In this way, the SUT 102 can be "soaked" (i.e., thoroughly tested) in a manner that is both time and resource efficient thereby reducing the cost of bringing a new product to market.

Figure 2A:
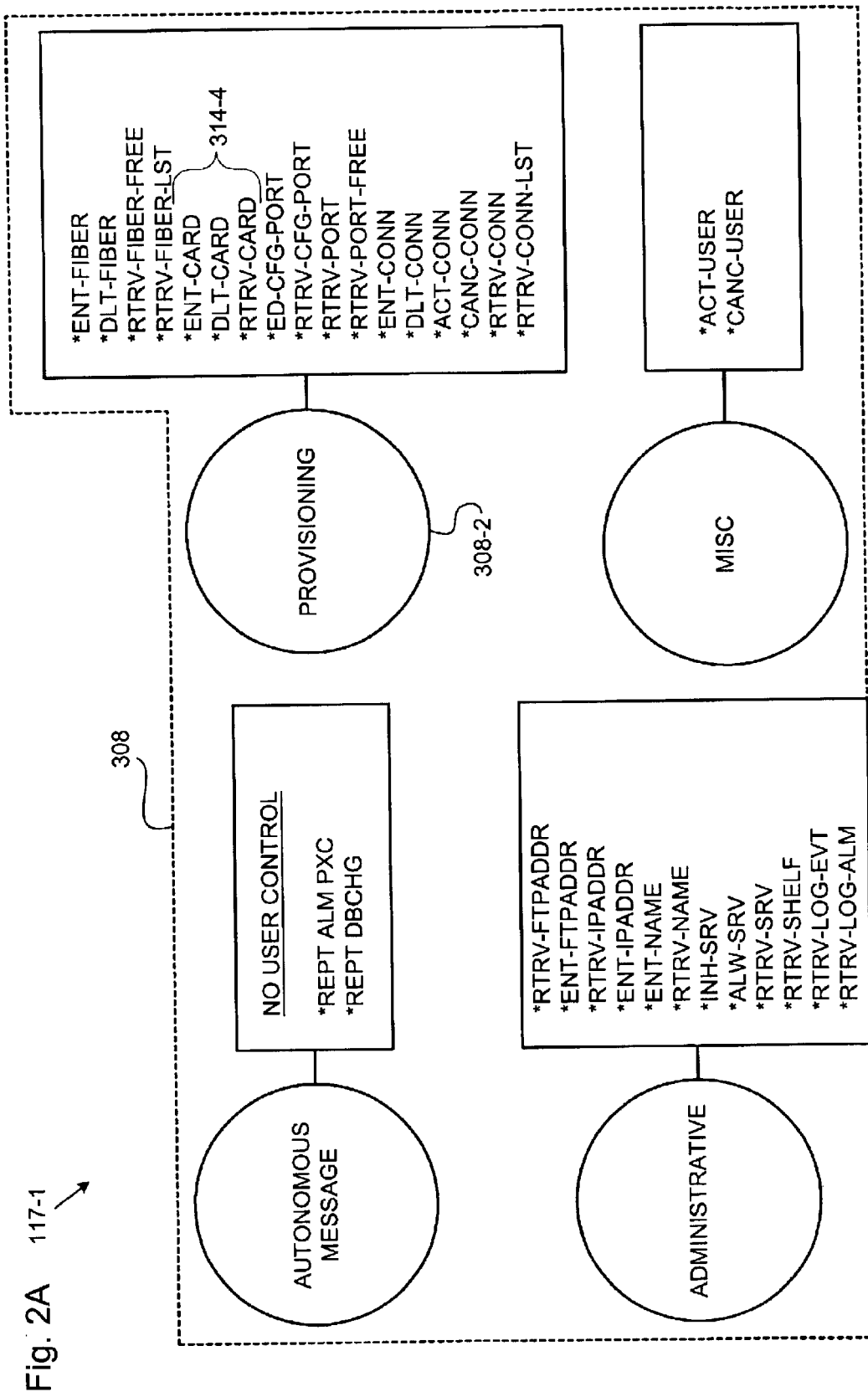
FIG. 2A illustrates an exemplary TL1 command model hierarchically grouped and categorized according to selected operational attributes of the various TL1 commands in accordance with an embodiment of the invention.
Figure 2B:
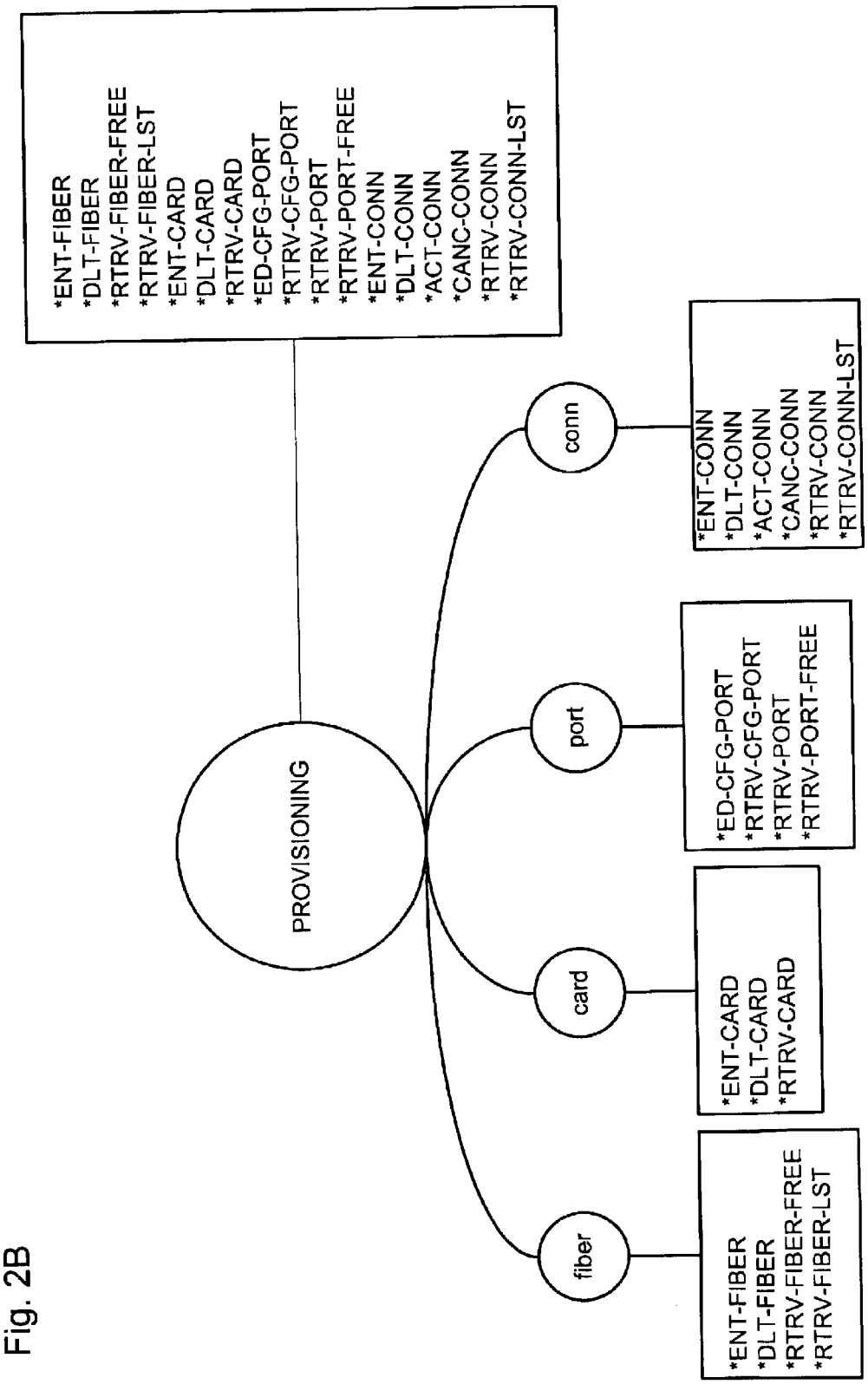
FIG. 2B illustrates a pictorial representation of the exemplary TL1 command model in accordance with an embodiment of the invention.

FIG. 2A illustrates an exemplary TL1 command model 117-1 hierarchically grouped and categorized according to selected operational attributes of the various TL1 commands in accordance with an embodiment of the invention. Using this hierarchically ordered test structure, other test areas such as SNMP, WebGUI, and Routing can also be incorporated in the test model 117 thereby providing a fully automated test mechanism that can be used by an entire test organization. FIG. 2B illustrates a pictorial representation of the exemplary TL1 command model 117-1 in accordance with an embodiment of the invention.

Figure 3:
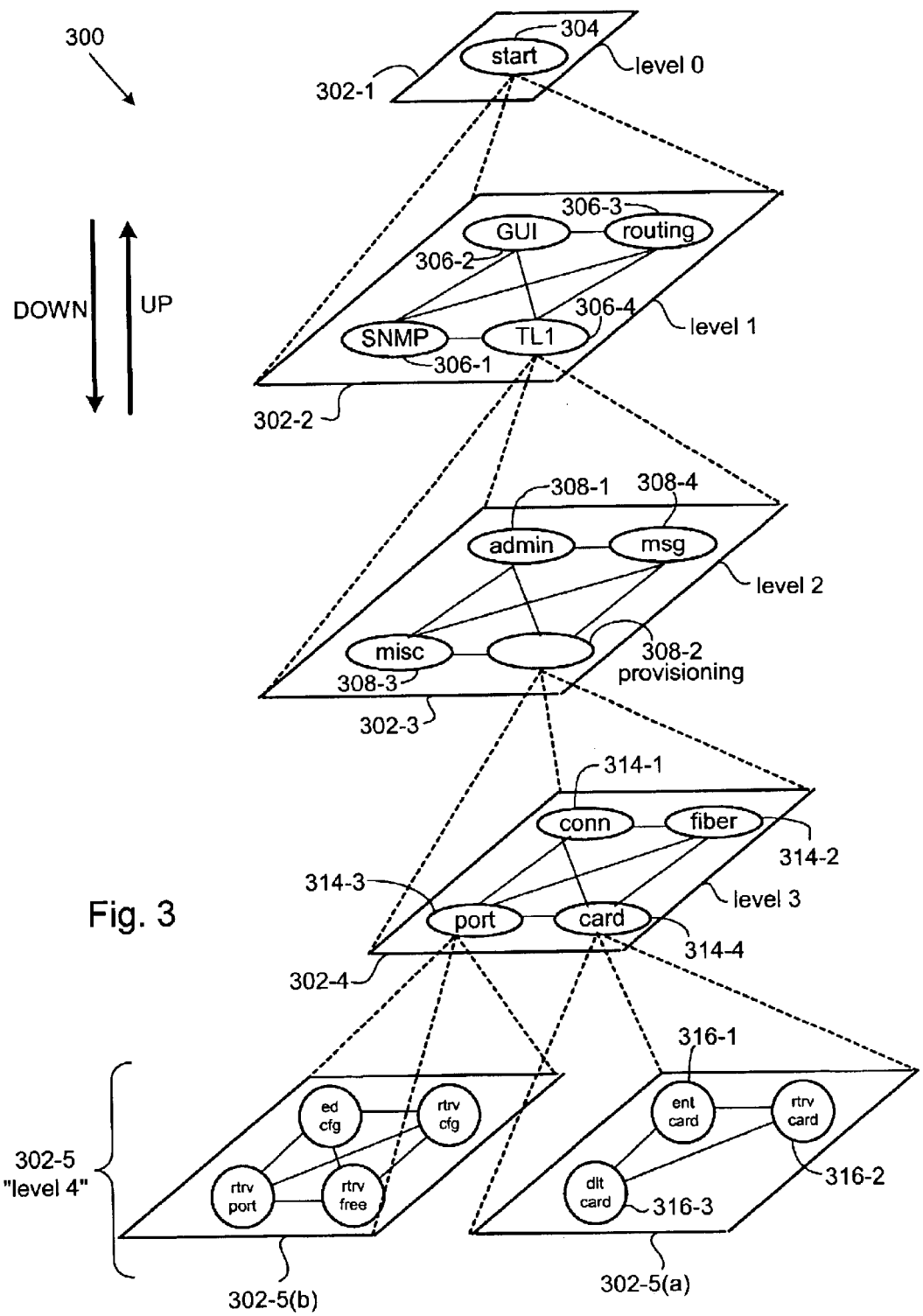
FIG. 3 shows a hierarchically ordered test structure in accordance with an embodiment of the invention.

FIG. 3 shows a hierarchically ordered test structure 300 in accordance with an embodiment of the invention. The test structure 300 is formed of a number of layers 302 having at the highest layer 302-1 (referred to as a "level 0") having a start node 304 defined as an entry point of the test structure 300. A layer 302-2 (i.e., "level 1"), is defined as a test area layer 302-2 having a number of test activity components 306 grouped according to a particular test protocol. For example, the test area layer 302-2 includes test area components such as a SNMP test component node 306-1, a WebGUI test component node 306-2, and a Routing test component 306-3 node in addition to a TL1 test component node 306-4 as one embodiment of the exemplary TL1 command model 117-1 shown in FIG. 2.

Descending down the hierarchically ordered test structure 300 from the test area layer 302-2 at the TL1 test component 306-4 to a TL1 system function level 302-3 (i.e., "level 2") provides access to a number of TL1 system functional group components 308 (also shown in FIGS. 2A and 2B). Such TL1 functional group components 308 include an administrative component 308-1, a provisioning component 308-2, a miscellaneous component 308-3, and an autonomous messaging component 308-4 each of which is well known to those skilled in the art. Each of the TL1 functional group components 308 (except for the autonomous messaging component 308-4) has a corresponding operation component in an operation component layer 302-4 each of which, in turn, is associated with a corresponding TL1 command set in a TL1 command set layer 302-5 (layer 4).

Descending down to the operation layer 302-4 from the provisioning node 308-2, for example, provides access to a number of provision type tests 314 including a connection type test node 314-1, a fiber type test node 314-2, a port type test node 314-3, and a card type test node 314-4. Descending further down the test structure 300 from the card type test node 314-4 on level 3 to the TL1 command set layer 302-5 on level 4 provides access to the various card type tests 316 at a TL1 command set sub-layer 302-5(a), specifically, an enter-card test node 316-1, an rtrv-card test node 316-2, and a dlt-card node 316-3.

Figure 4A:
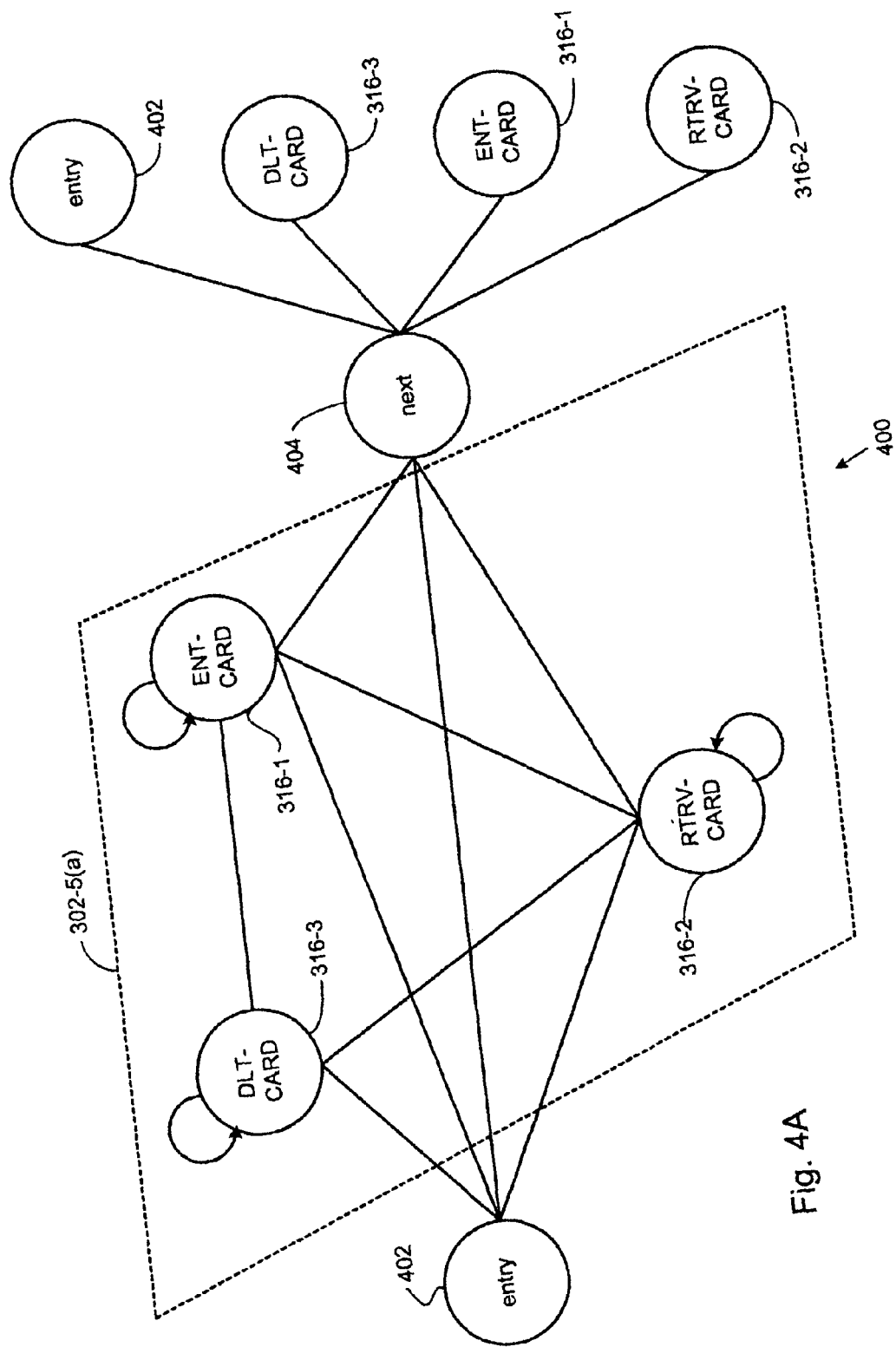
FIGS. 4A–4B show a particular transition diagrams in accordance with an embodiment of the invention.
Figure 4B:
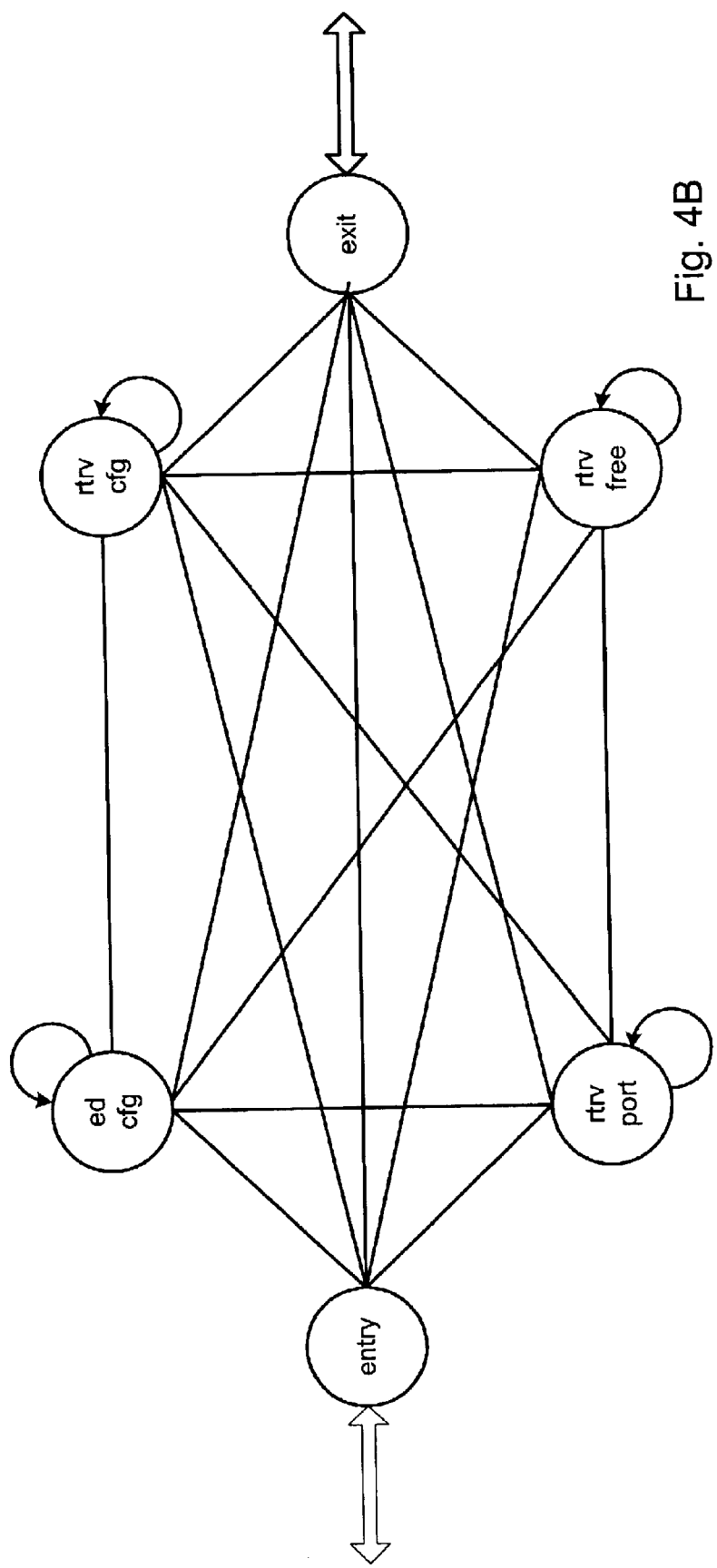

It should be noted that any two nodes of the hierarchically ordered test structure 300 represents a valid transition between those two nodes either at the same level or between levels. For example, referring to FIG. 4A showing a transition diagram 400 corresponding to the command set sub-layer 302-5(a) of the TL1 command set layer 302-5 having three command components 316-1 through 316-3. As shown in FIG. 4A, an entry point 402 is used to enter the transition diagram 400 and serves as an access point for a current layer from a next higher layer. In this case, the entry node 402 would provide an access point from the layer 3024 at the node 314-4 to the layer 302-5(a) (and back again) and from the layer 302-4 at the node 314-3 to a sub-layer 302-5(b), for example. In the described embodiment, since all nodes are fully meshed, each nodal transition can go from one node to another node or can loop back upon itself except for the case where the node is an entry type node. In the case of an entry node, a transition to an entry node and back out an entry node can only occur by way of a next node at which point, the transition would result in exiting the current layer and moving back up one layer. For example, a transition from the layer 302-4 at the node 314-4 to the layer 302-5(a) would occur at the entry node 402 whereas exiting the layer 302-5(a) back up to the layer 302-4 can only occur by way of a transition from a next node 404 to the entry node 402. FIG. 4B illustrates another example of a transition diagram 450 based upon the port test node 314-3 shown in FIG. 3.

Figure 5:
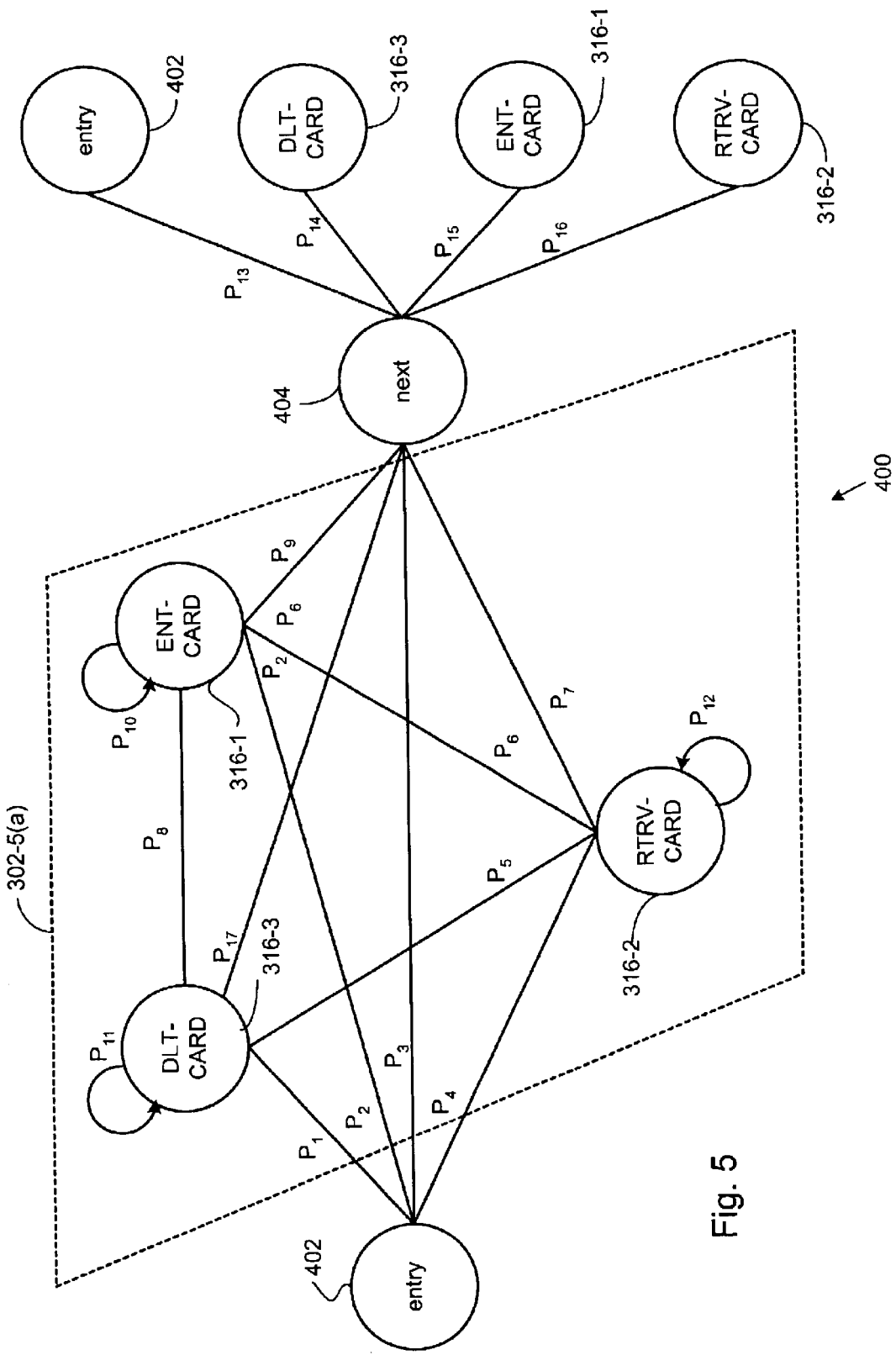
FIG. 5 shows a fully meshed probabilistic transition diagram in accordance with an embodiment of the invention.

Referring back to FIG. 1, once the user profile 108 has created in the form of the test model 300, the translator 104 assigns various transition probability weights to the nodal transitions in the test model 300 based upon the probability indices $P_1$ included in the user specific probability profile 118. Based upon the probability index $P_1$ associated with each transition, the likelihood (or probability) of a transition between any two nodes (or a loop back type transition) is directly related to the associated transition probability. It should be noted, however, that the assignment of any particular probability index ($P_1$ in FIG. 5, for example, connecting node "entry" to node "dlt-card") can be directional specific. More specifically, for example, in that the transition from "entry" to "dlt-card" may take on a probability of 0.8 (i.e., 80% chance) while a reverse transition may be only 0.1 (10% chance). For example, if a particular transition is forbidden, then the associated transition probability is set to 0.0 otherwise, the summation of all probability indices associated with a particular node must equal 1. For example, as shown in FIG. 5, referring to the ent-card node 316-1, the sum of the probability indices $P_{10}$, $P_8$, $P_2$, $P_6$, and $P_9$ must equal 1. In this way, by adjusting the various probability weighting indices, the probabilistic properties of the transition model 300 can be adjusted based upon the requirements of a particular user. For example, since exiting the layer 302-5(b) and transitioning back up to the layer 302-4 can only occur by way of a transition from the next node 404 to the entry node 402, the probability indices associated with these transitions determine the likelihood of this particular transaction which are, in this case, the probability indices $P_3$ and $P_{13}$. It should be noted that in a preferred embodiment, the entry node and the exit node are included in all layers except for layer 0. This particular implementation decouples the usage based model 106 from the user functional model 108 such that the translator 104 can provide a fully meshed model in a TL1 model independent manner.

Referring back to FIG. 1, once fully compiled, the translator 104 outputs the usage based model 106 as a fully meshed, probabilistic model having all possible transitions of one component to any other component at the same level. The probability weight is assigned based upon the assumption that a transition between any two nodes is equally likely. The usage based model 106 is then provided to a sequence generator 122 arranged to use the usage based model 106 and perform a random state walk (using a random number generator) starting from the start node 304 on layer 0. As a result of traversing various states, a random sequence of TL1 commands 124 is generated.

In the described embodiment, the random sequence of TL1 commands 124 is then read by an execution engine 126 that, in turn, sends them to the SUT 102 for execution. The test results of the execution are written to an output file 128 which is used by a post processor 130 to determine the validity of the responses.

Figure 6:
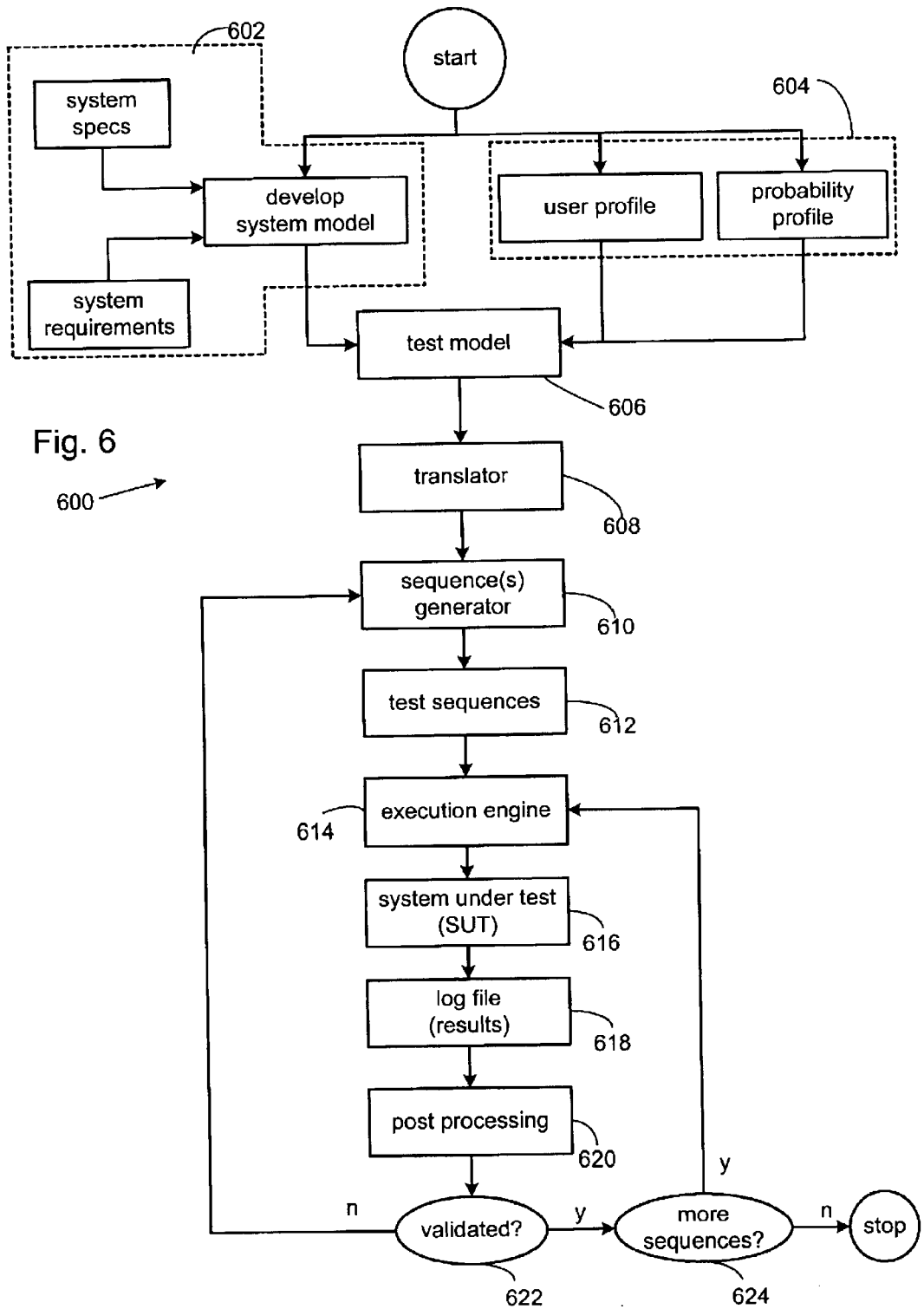
FIG. 6 shows a detailed flowchart describing a process for testing a system under test using a probabilistic test sequence generator in accordance with an embodiment of the invention.

FIG. 6 shows a detailed flowchart describing a process 600 for testing a system under test using a probabilistic test sequence generator in accordance with an embodiment of the invention. The process 600 begins at 602 where a system model is developed based upon system operational specifications and system requirements. In addition to the system model, a user functional model is generated at 604 based upon a base user profile and an associated user specific probability file having probability indices associated with the base user profile. At 606 a nodal based hierarchical fully meshed test model is generated based upon the system model and the user functional model. At 608, a translator forms a probabilistic usage model by assigning various transition probability weights to the nodal transitions in the test model based upon the probability indices included in the user specific probability profile. At 610, the probabilistic usage model is provided to a sequence generator. In the described embodiment, the sequence generator is arranged to use the probabilistic usage model and performs a random state walk starting from a start node. The result of the random state walk is a probabilistic test sequence at 612 which forms an input to an execution engine. In the described embodiment, the probabilistic test sequence is a random sequence of TL1 commands. At 614, the random sequence of TL1 commands is then read by an execution engine that, in turn, sends them to the SUT for execution at 616. At 618, the test results of the execution are written to an output file that is used by a post processor 620 to determine the validity of the responses at 622. If the response is determined to be valid, then the test result is posted, otherwise, control is passed back to 610 for generation of additional test sequences.

Figure 7:
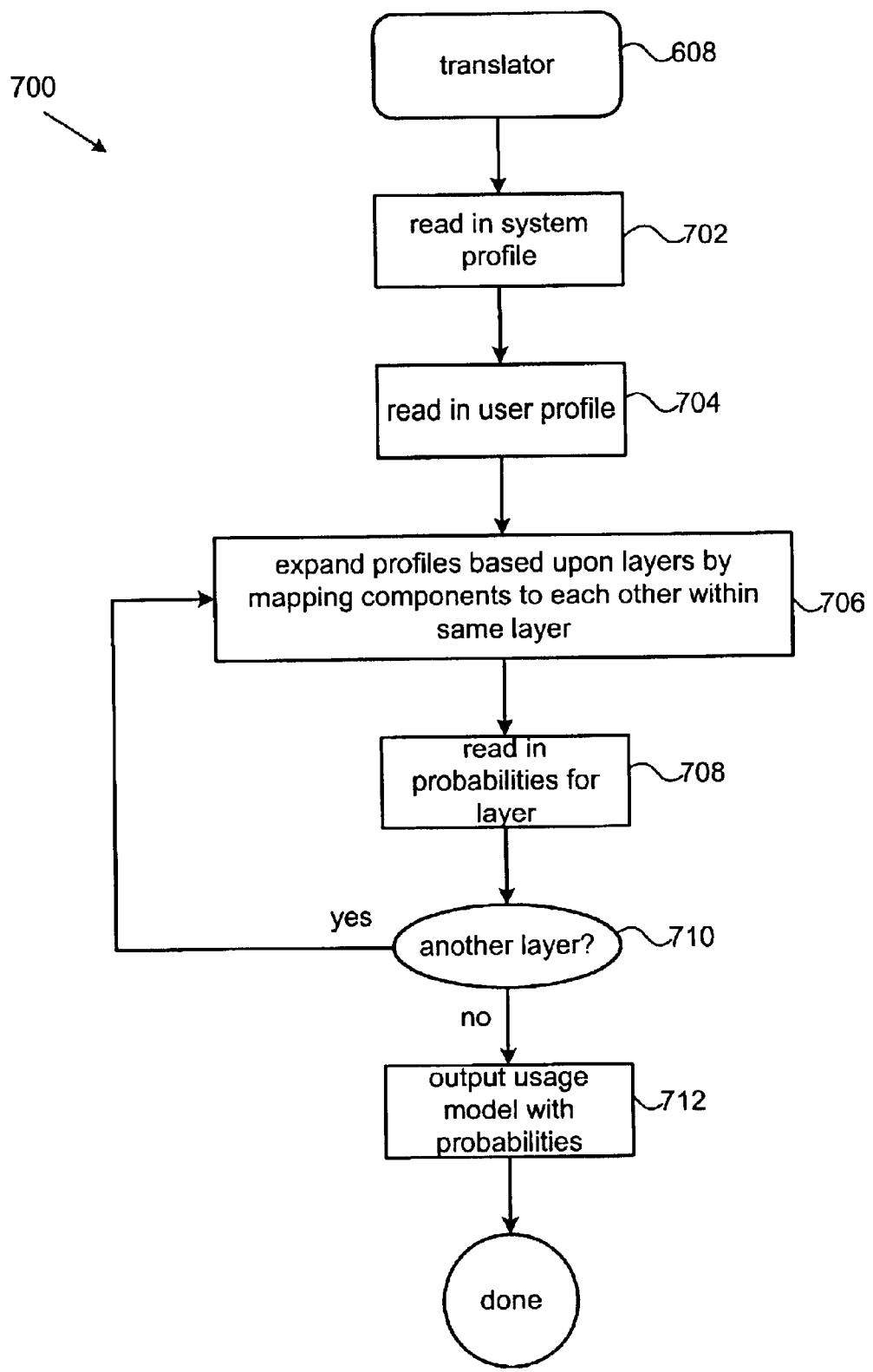
FIG. 7 shows a flowchart detailing a process being a particular implementation of the translator operation of the process shown in FIG. 6.

FIG. 7 shows a flowchart detailing a process 700 being a particular implementation of the translator operation 608 of the process 600 in accordance with an embodiment of the invention. It should be noted that the process 700 is only one of many possible implementations of the translator operation 608 and should therefore not be considered limiting either the scope or intent of the invention. Accordingly, the process 700 begins at 702 by the translator reading in the test model file. At 704, the translator expands the test model by mapping various components on one layer to each other at a particular layer. At 706, all probabilities for the particular layer are associated with the mapped components while at 708, a determination is made whether or not there are additional layers. If there are additional layers, then control is passed back to 706, otherwise control is passed to 710 where the probabilistic usage model is output.

Figure 8:
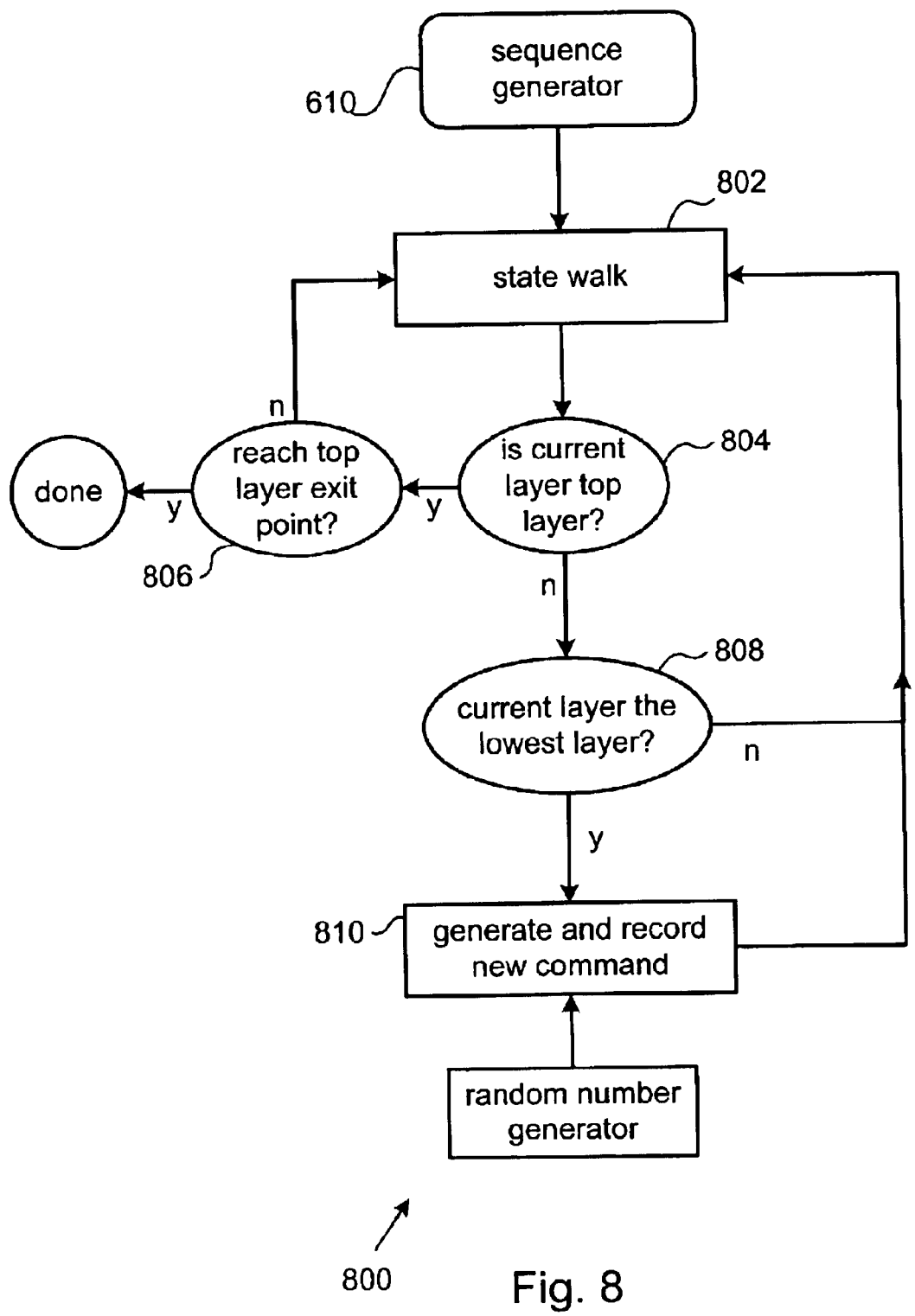
FIG. 8 shows a flowchart detailing a process being a particular implementation of the sequence generator operation of process detailed in FIG. 6.

FIG. 8 shows a flowchart detailing a process 800 being a particular implementation of the sequence generator operation 610 of the process 600 in accordance with an embodiment of the invention. It should be noted that the process 600 is only one of many possible implementations of the sequence generator operation 610 and should therefore not be considered limiting either the scope or intent of the invention. Accordingly, the process 800 begins at 802 whereby, based a state walk is performed at a current layer. Next, at 804, a determination is made whether or not the current layer is a top layer and if so has an exit point been reached at 806. If a top layer exit point is reached, then the process ends otherwise control is passed back to 802. Returning back to 804, if the current layer is not a top layer, then a determination is made at 808 whether or not the current layer is the lowest layer. If the current layer is not the lowest layer, then control is passed back to 802, otherwise, a new command is generated and recorded at 810 based upon a random number and control is passed back to 802.

Figure 9:
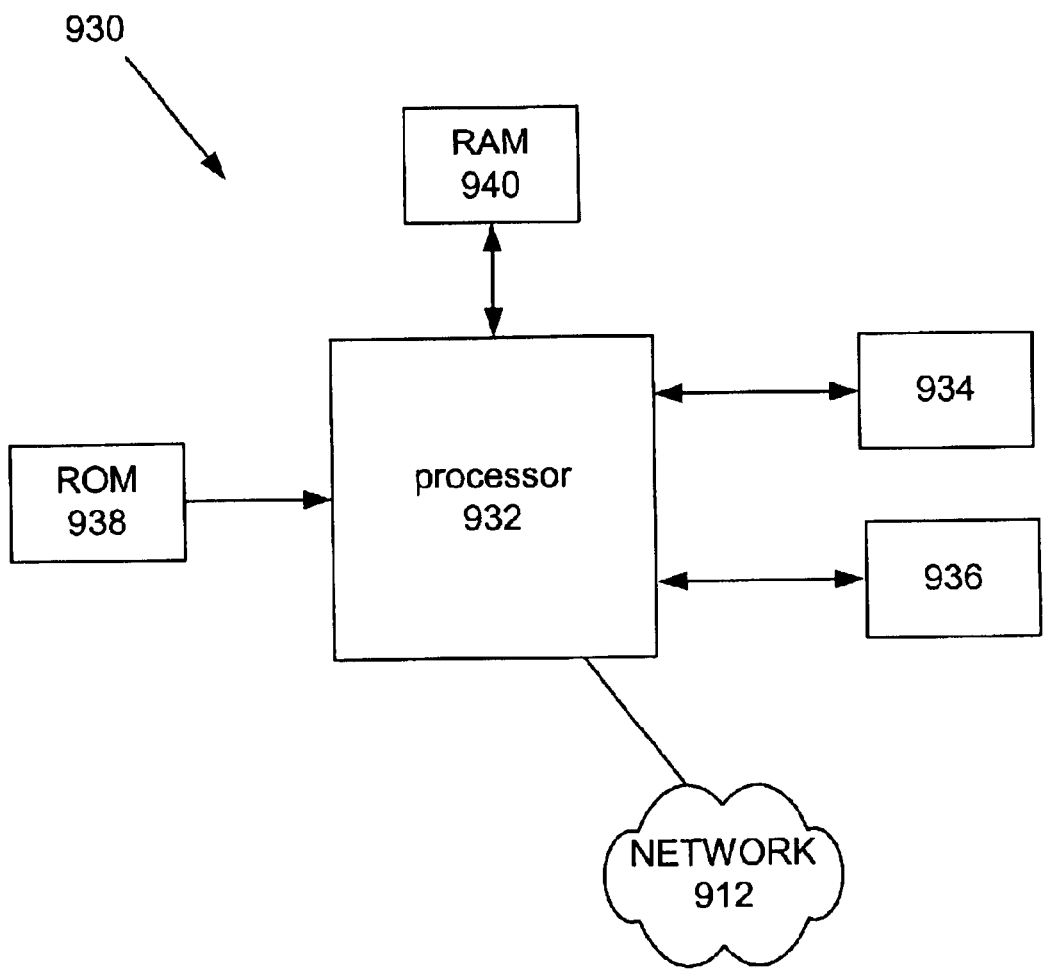
FIG. 9 illustrates a computer system that can be employed to implement the present invention.

FIG. 9 illustrates a computer system 900 that can be employed to implement the present invention. The computer system 900 or, more specifically, CPUs 902, may be arranged to support a virtual machine, as will be appreciated by those skilled in the art. As is well known in the art, ROM acts to transfer data and instructions uni-directionally to the CPUs 902, while RAM is used typically to transfer data and instructions in a bi-directional manner. CPUs 902 may generally include any number of processors. Both primary storage devices 904, 906 may include any suitable computer-readable media. A secondary storage medium 908, which is typically a mass memory device, is also coupled bi-directionally to CPUs 902 and provides additional data storage capacity. The mass memory device 908 is a computer-readable medium that may be used to store programs including computer code, data, and the like. Typically, mass memory device 908 is a storage medium such as a hard disk or a tape which generally slower than primary storage devices 904, 906. Mass memory storage device 908 may take the form of a magnetic or paper tape reader or some other well-known device. It will be appreciated that the information retained within the mass memory device 908, may, in appropriate cases, be incorporated in standard fashion as part of RAM 906 as virtual memory. A specific primary storage device 904 such as a CD-ROM may also pass data uni-directionally to the CPUs 902.

CPUs 902 are also coupled to one or more input/output devices 910 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 902 optionally may be coupled to a computer or telecommunications network, e.g., an Internet network or an intranet network, using a network connection as shown generally at 912. With such a network connection, it is contemplated that the CPUs 902 might receive information from the network, or might output information to the network in the course of performing the above-described method steps. Such information, which is often represented as a sequence of instructions to be executed using CPUs 902, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. It should be appreciated that the present invention may generally be implemented on any suitable computer system. Therefore, the present examples are to be considered as illustrative and not restrictive, and the invention is not to be limited to the details given herein, but may be modified within the scope of the appended claims along with their full scope of equivalents.

What is claimed is:

1. A statistical test tool for operational testing of a system under test (SUT), comprising:

a user specific usage model generator arranged to provide a statistically accurate user specific usage model based upon a particular user profile;

a translator coupled to the usage model generator arranged to expand the usage model provided the by the usage model generator into a fully meshed file; and a sequence generator coupled to the translator that uses the fully meshed file to automatically generate a random sequence of commands.

2. A statistical test tool for operational testing of a system under test as recited in claim 1, further comprising:

an execution engine coupled to the sequence generator configured to, read the random sequence of commands, and send the random sequence of commands to the system under test (SUT) wherein the SUT generates a system response based upon the random sequence of commands.

3. A statistical test tool for operational testing of a system under test as recited in claim 1, wherein the usage profile comprises:

a test command model that contains a plurality of expected user system test commands; and a user specific probability profile that contains a plurality of probability indices each of which corresponds to a particular one of the plurality of expected user system test commands.

4. A statistical test tool for operational testing of a system under test as recited in claim 1, wherein the test command model comprises:

a hierarchically ordered test structure formed of a plurality of hierarchically ordered test layers each of which includes, a test layer entry point, a plurality of associated test components, and a test layer exit point, wherein a highest order test layer includes a start node arranged to provide a test structure entry point and a stop node arranged to provide a test structure exit point.

5. A statistical test tool for operational testing of a system under test as recited in claim 4, wherein the fully meshed file includes most transitions of a particular test component to any other test component, including itself, on a specific test layer.

6. A statistical tool as recited in claim 5, wherein the sequence generator comprises:

a random number generator suitable for providing a random number;

a state walk generator arranged to randomly select a particular test structure node at a current test layer such that a new command is generated and recorded whenever the particular test structure node is not the exit node and the current test layer is a lowest current layer.

7. A test tool as recited in claim 1, wherein the test tool is a TL1 test tool.

8. A method for providing a statistical test tool for operational testing of a system under test (SUT), comprising:

providing a statistically accurate user specific usage model based upon a particular user profile;

expanding the usage model provided the by the usage model generator into a fully meshed file; and automatically generating a random sequence of commands based upon the fully meshed file.

9. A method as recited in claim 8, further comprising:

reading the random sequence of commands;

sending the random sequence of commands to the system under test (SUT); and generating a system response based upon the random sequence of commands by the SUT.

10. A method as recited in claim 8, wherein the usage profile comprises:

a test command model that contains a plurality of expected user system test commands; and a user specific probability profile that contains a plurality of probability indices each of which corresponds to a particular one of the plurality of expected user system test commands.

11. A method as recited in claim 8, wherein the test command model comprises:

a hierarchically ordered test structure formed of a plurality of hierarchically ordered test layers each of which includes, a test layer entry point, a plurality of associated test components, and a test layer exit point, wherein a highest order test layer includes a start node arranged to provide a test structure entry point and a stop node arranged to provide a test structure exit point.

12. A method as recited in claim 11, wherein the fully meshed file includes most transitions of a particular test component to any other test component, including itself, on a specific test layer.

13. A method as recited in claim 12, further comprising:

providing a random number;

randomly selecting a particular test structure node at a current test layer; and generating and recording a new command whenever the particular test structure node is not the exit node and the current test layer is a lowest current layer.

14. A test tool as recited in claim 8, wherein the test tool is a TL1 test tool.

15. An apparatus for providing a statistical test tool for operational testing of a system under test (SUT), comprising:

means for providing a statistically accurate user specific usage model based upon a particular user profile;

means for expanding the usage model provided by the usage model generator into a fully meshed file; and means for automatically generating a random sequence of commands based upon the fully meshed file.

16. An apparatus as recited in claim 15, further comprising: means for reading the random sequence of commands; means for sending the random sequence of commands to the system under test (SUT); and means for generating a system response based upon the random sequence of commands by the SUT.

17. An apparatus as recited in claim 15, wherein the usage profile comprises:

a test command model that contains a plurality of expected user system test commands; and a user specific probability profile that contains a plurality of probability indices each of which corresponds to a particular one of the plurality of expected user system test commands.

18. An apparatus as recited in claim 15, wherein the test command model comprises:

a hierarchically ordered test structure formed of a plurality of hierarchically ordered test layers each of which includes, a test layer entry point, a plurality of associated test components, and a test layer exit point, wherein a highest order test layer includes a start node arranged to provide a test structure entry point and a stop node arranged to provide a test structure exit point.

19. An apparatus as recited in claim 18, wherein the fully meshed file includes all transitions of a particular test component to any other test component, including itself on a specific test layer.

20. An apparatus as recited in claim 19, further comprising:

means for providing a random number;

means for randomly selecting a particular test structure node at a current test layer, and means for generating and recording a new command whenever the particular test structure node is not the exit node and the current test layer is a lowest current layer.

21. An apparatus as claimed in claim 15, wherein said apparatus is a TL1 test tool.

22. A TL1 based statistical test tool for operational testing of a system under test (SUT), comprising:

a TL1 usage model generator arranged to provide a statistically accurate usage model based upon a particular user profile;

a translator coupled to the TL1 usage model generator arranged to expand the usage model provided the by TL1 usage model generator into a fully meshed file; wherein the fully meshed file includes all transitions of a particular test component to any other test component, including itself on a specific test level;

a TL1 sequence generator coupled to the translator that uses the fully meshed file to automatically generate a random sequence of TL1 commands; and an execution engine coupled to the TL1 sequence generator configured to, read the random sequence of TL1 commands, and send the random sequence of TL1 commands to the system under test (SUT) wherein the SUT generates a system response based upon the random sequence of TL1 commands.

* * * * *